United States Patent
Hercouet et al.

(10) Patent No.: US 10,718,400 B2
(45) Date of Patent: Jul. 21, 2020

(54) ANTI-VIBRATORY SUPPORT FOR A MOTOR VEHICLE AND MOTOR VEHICLE EQUIPPED WITH SAME

(71) Applicant: Cooper Standard France, Rennes (FR)

(72) Inventors: Roland Hercouet, Bréal-sous-Montfort (FR); Aurélien Vivion, Rennes (FR); Yvon Tirel, Chartres de Bretagne (FR)

(73) Assignee: Cooper Standard France (FR)

( * ) Notice: Subject to any disclaimer, the term of this patent is extended or adjusted under 35 U.S.C. 154(b) by 0 days.

(21) Appl. No.: 16/339,237

(22) PCT Filed: Oct. 6, 2016

(86) PCT No.: PCT/FR2016/052578
§ 371 (c)(1),
(2) Date: Apr. 3, 2019

(87) PCT Pub. No.: WO2018/065677
PCT Pub. Date: Apr. 12, 2018

(65) Prior Publication Data
US 2019/0285134 A1 Sep. 19, 2019

(51) Int. Cl.
*F16F 15/08* (2006.01)
*F16F 1/36* (2006.01)
(Continued)

(52) U.S. Cl.
CPC ............ *F16F 15/08* (2013.01); *F16F 1/3605* (2013.01); *F16F 1/3732* (2013.01);
(Continued)

(58) Field of Classification Search
CPC .......... B60K 5/00; B60K 5/1216; B60K 5/12; F16F 15/08
See application file for complete search history.

(56) References Cited

U.S. PATENT DOCUMENTS 3,243,239 A * 3/1966 Hackman ............... F16F 1/3935
384/203
4,067,525 A 1/1978 Allen
(Continued)

FOREIGN PATENT DOCUMENTS

DE 102010015882 A1 9/2011
DE 102011006917 A1 10/2012

OTHER PUBLICATIONS

International Search Report Application No. PCT/FR2016/052578 dated Mar. 30, 2017, 3 pages.

*Primary Examiner* — John D Walters
*Assistant Examiner* — James J Triggs
(74) *Attorney, Agent, or Firm* — Lerner, David, Littenberg, Krumholz & Mentlik, LLP

(57) ABSTRACT

The invention relates to an anti-vibration support, comprising first, second and third frames, which are metallic, accessible from the outside and separate from one another, at least one part made of elastomer. The invention is characterized in that the support also comprises a member made of thermoplastic material comprising at least one reinforcement, which has continuous-fibers and which is a prefabricated part, to reinforce the mechanical strength of the anti-vibration support, the first and second frames being far from one another in a first, substantially horizontal, direction, are intended to be fixed to a body of a motor vehicle and are connected one to another by means of the member made of thermoplastic material, the member made of thermoplastic material being over-molded with respect to at least a portion of at least one surface of the reinforcement, with respect to first and second surfaces of the first and second frames and with respect to at least one surface of the part made of elastomer supporting the third metal frame intended for the suspension of a vibrating portion of the
(Continued)

vehicle, for damping and filtering mechanical vibrations between the body and the vibrating portion.

16 Claims, 9 Drawing Sheets

(51) Int. Cl.
*F16F 1/373* (2006.01)
*B60K 5/12* (2006.01)
(52) U.S. Cl.
CPC ....... *B60K 5/1266* (2013.01); *F16F 2224/025* (2013.01); *F16F 2224/0241* (2013.01); *F16F 2230/0005* (2013.01)

(56) References Cited

U.S. PATENT DOCUMENTS

| | | | | |
|---|---|---|---|---|
| 4,886,251 | A | * 12/1989 | Haussermann | F16F 13/26 267/140.13 |
| 5,074,374 | A | * 12/1991 | Ohtake | B60K 5/1216 180/300 |
| 5,704,598 | A | 1/1998 | Kojima | |
| 6,959,922 | B2 | * 11/2005 | Miyahara | B60K 5/04 180/291 |
| 6,988,579 | B2 | * 1/2006 | Miyahara | F16F 1/38 180/299 |
| 7,393,016 | B2 | * 7/2008 | Mitsui | B62D 25/08 180/232 |
| 8,511,416 | B2 | * 8/2013 | Hiruma | B60K 1/00 180/291 |
| 2006/0091594 | A1 | 5/2006 | Miyahara | |

\* cited by examiner

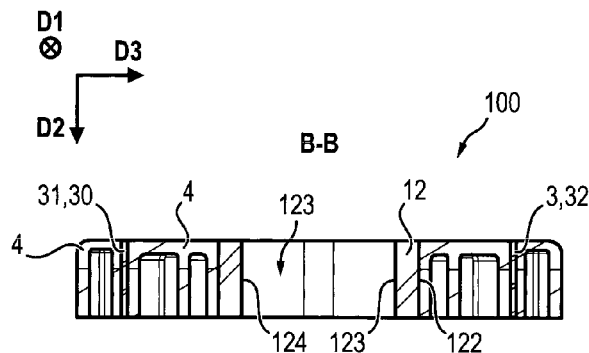
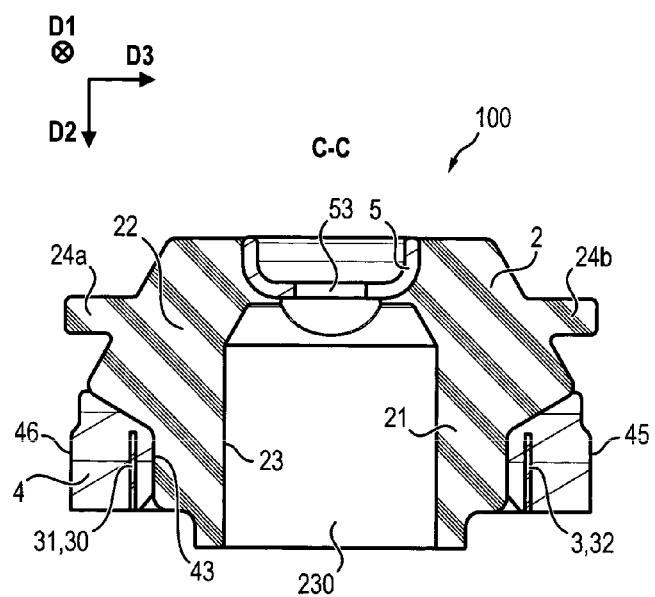

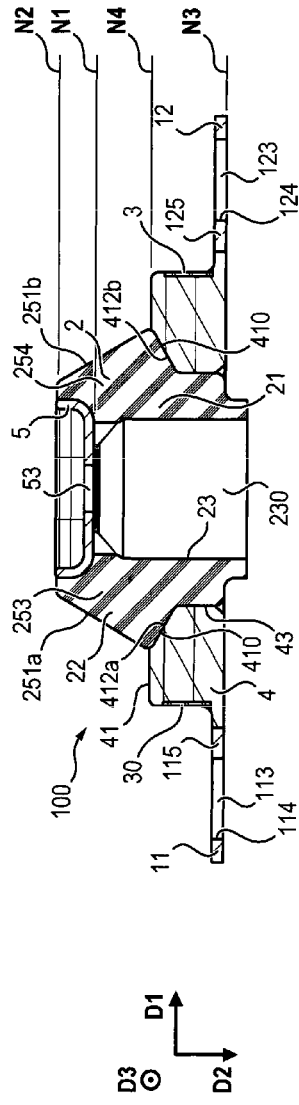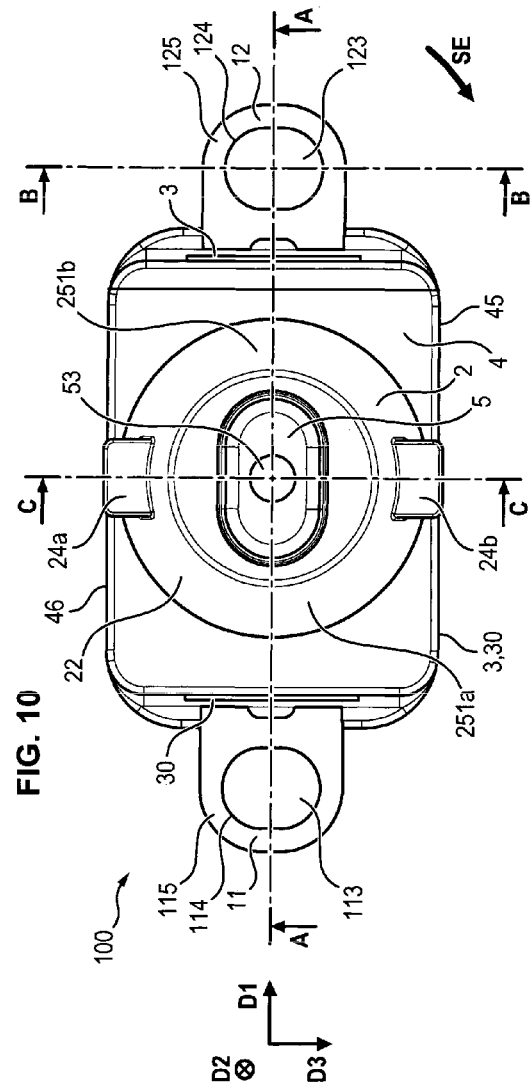

ANTI-VIBRATORY SUPPORT FOR A MOTOR VEHICLE AND MOTOR VEHICLE EQUIPPED WITH SAME

CROSS-REFERENCE TO RELATED APPLICATIONS

The present application is a national phase entry under 35 U.S.C. § 371 of International Application No. PCT/FR2016/052578, filed Oct. 6, 2016, all of which are incorporated herein by reference.

The invention relates to an anti-vibration support.

One field of application of the invention relates to motor vehicles in which a vibrating portion, such as an engine for example, is mounted on the body by means of one or more anti-vibration supports.

One of the problems posed by these anti-vibration supports is their weight.

In fact, lightening the parts is desired in the automotive sector.

However, this desired lightening must not occur to the detriment, either of mechanical strength of the anti-vibration support not to the damping of vibrations which is to be accomplished by the anti-vibration support.

In fact, the vibrating portion has a tendency to transmit vibration to the body by means of the support. Moreover, the anti-vibration support must allow the motor vehicle to successfully pass mechanical strength tests, in particular crash tests.

The invention aims to obtain an anti-vibration support of lighter weight penalizing neither mechanical strength, nor vibration damping, nor the filtering of vibrations which are to be obtained from the anti-vibration support.

To this end, a subject matter of the invention is an anti-vibration support (100), comprising first, second and third frames (11, 12, 5), which are metallic, accessible from the outside and separate from one another, at least one part (2) made of elastomer, characterized in that the support also comprises a member (4) made of thermoplastic material comprising at least one reinforcement (3), which has continuous-fibers and which is a prefabricated part, to reinforce the mechanical strength of the anti-vibration support, the first and second frames (11, 12) being far from one another in a first, substantially horizontal, direction (D1), are intended to be fixed to a body of a motor vehicle and are connected together by means of the member (4) made of thermoplastic material, the member (4) made of thermoplastic material being over-molded with respect to at least a portion of at least one surface of the reinforcement (3), with respect to first and second surfaces (112, 122) of the first and second frames (11, 12) and with respect to at least one surface of the part (2) made of elastomer supporting the third metal frame (5) intended for the suspension of a vibrating portion of the vehicle, for damping and filtering mechanical vibrations between the body and the vibrating portion.

Thanks to the invention, the anti-vibration support ensures good mechanical strength against forces exerted between the first metal frame and the second metal frame, which allows crash tests, requiring this mechanical strength to be greater than a prescribed value, to be passed successfully.

The reinforcement can have various shapes.

For example, according to one embodiment, the first metal frame is connected to the second metal frame by an assembly of generally annular shape (member made of thermoplastic material, reinforcement, part made of elastomer) which has a reduced weight with respect to metal and, by connecting with the third metal frame which must be fixed to the vibrating portion allows to damp the vibrations coming from the latter and sent to this third metal frame.

According to one embodiment of the invention, the reinforcement (3) surrounds the first and second surfaces (112, 122) at least in the first, substantially horizontal, direction (D1).

According to one embodiment of the invention, the member (4) made of thermoplastic material comprises a first through opening (43) in a second, substantially vertical, direction (D2), the first through opening (43) being surrounded by the reinforcement (3), an inner portion (21) of the part (2) made of elastomer itself having a second through opening (23) in the second direction (D2), a passage (230), which opens downward in the second direction (D2) below the third frame (5) being delimited by the second through opening (23), the passage (230) being surrounded by the first through opening (43).

According to one embodiment of the invention, the third metal frame (5) comprises at least one third through opening (53) in the second direction (D2), the third through opening (53) being situated above the second third through opening (23) in the second direction (D2).

According to one embodiment of the invention, the reinforcement (3) extends in a substantially horizontal winding direction (SE) around the second direction (D2), and has unidirectional continuous fibers extending in the winding direction (SE) and embedded in a polymer to form the prefabricated part having the shape of a loop (30).

According to one embodiment of the invention, the second through opening (23) of the part (2) made of elastomer passes through the first opening (43) of the member (4) made of thermoplastic material in the second direction (D2).

According to one embodiment of the invention, the reinforcement (3) extends around the second direction (D2) and surrounds the first through opening (43) and the second through opening (23).

According to one embodiment of the invention, the part (2) made of elastomer comprises an upper portion (22) covering a portion (410) of the upper surface (41) of the member (4) made of thermoplastic material and supporting the third frame (5).

According to one embodiment of the invention, the first and second surfaces (112, 122) are vertical.

According to one embodiment of the invention, the part (2) made of elastomer comprises a first abutment protrusion (24a) and a second abutment protrusion (24b), which are intended to abut downward against other corresponding portions of the anti-vibration support and which are far from one another transversely to a second substantially vertical direction (D2).

According to one embodiment of the invention, the third frame (5) extends along a second, substantially vertical, direction (D2) between a first lower level (N1) and a second upper level (N2), the member (4) made of thermoplastic material extends along the second, substantially vertical, direction (D2) between a third lower level (N3) and a fourth upper level (N4), the first lower level (N1) being situated above the fourth upper level (N4).

According to one embodiment of the invention, the first and second frames (11, 12) respectively comprise first and second holes (113, 123), which are used for passage in a second, substantially vertical, direction (D2) for fixing to the body of the motor vehicle and which are delimited respectively by third and fourth free surfaces (114, 124), the third and fourth free surfaces (114, 124) being accessible from the outside and connected to the first and second surfaces (112, 122).

According to one embodiment of the invention, the first and second frames (11, 12) are formed respectively by first and second rings (11, 12) delimiting the first and second holes (113, 123), the third and fourth free surfaces (114, 124) being situated at an inner side of the first and second rings (11, 12), the first and second surfaces (112, 122) being situated at an outer side of the first and second rings (11, 12).

According to one embodiment of the invention, the third and fourth surfaces (114, 124) and the first and second holes (1113, 1213) are situated respectively on first and second outer fixing tabs (115, 125) protruding out toward the outside of the member (4) in the first, substantially horizontal direction (D1).

According to one embodiment of the invention, the first and second tabs (115, 125) are horizontal and angled with respect to the first and second vertical surfaces (112, 122).

A second subject matter of the invention is a motor vehicle, comprising a body, an engine mounted on the body and at least one anti-vibration support as described above, the first and second frames (11, 12) being fixed to the body, the third metal frame (5) being fixed to the engine situated below the anti-vibration support (100).

The invention will be better understood upon reading the description that follows, given solely by way of a non-limiting example with reference to the appended drawings, in which:

FIGS. 1, 3 and 4 are schematic views in vertical section along a vertical section plane A-A, extending from the first to the second frame, and second vertical section planes B-B and C-C perpendicular to the section plane A-A, passing through the first frame and the third frame, of an anti-vibration support according to a first embodiment of the invention;

Figure 1:
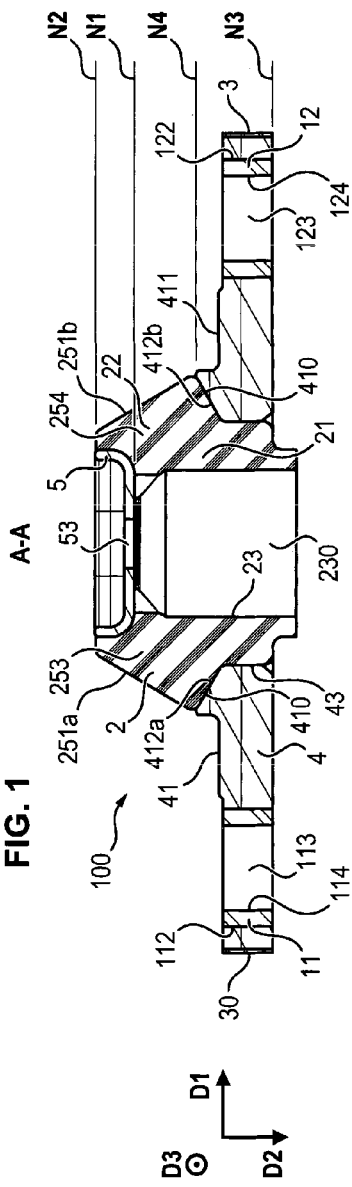
Figure 2:
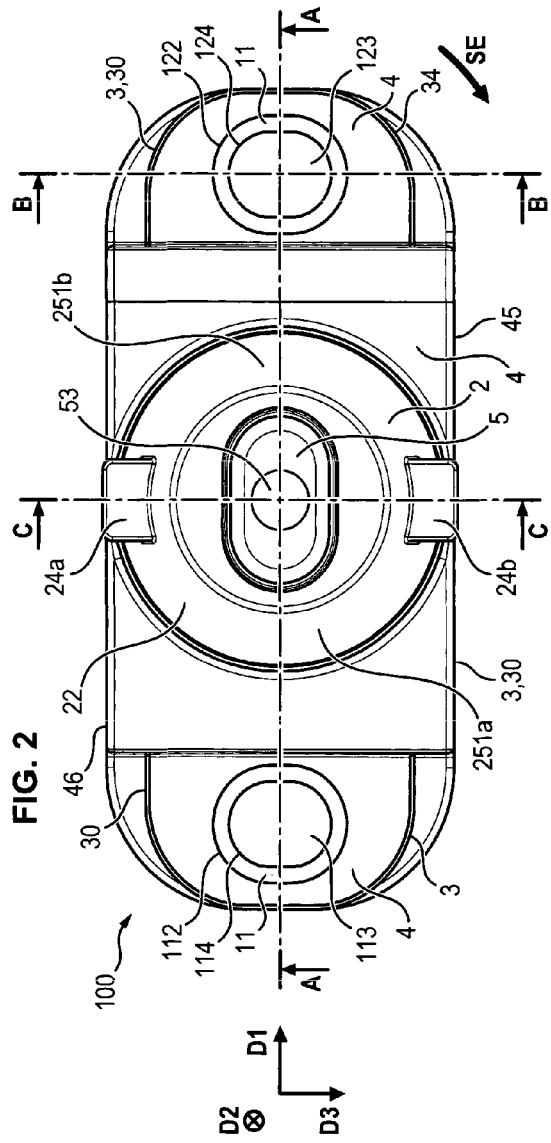
FIG. 2 is a schematic top view of the anti-vibration support according to the first embodiment of the invention.
Figure 5:
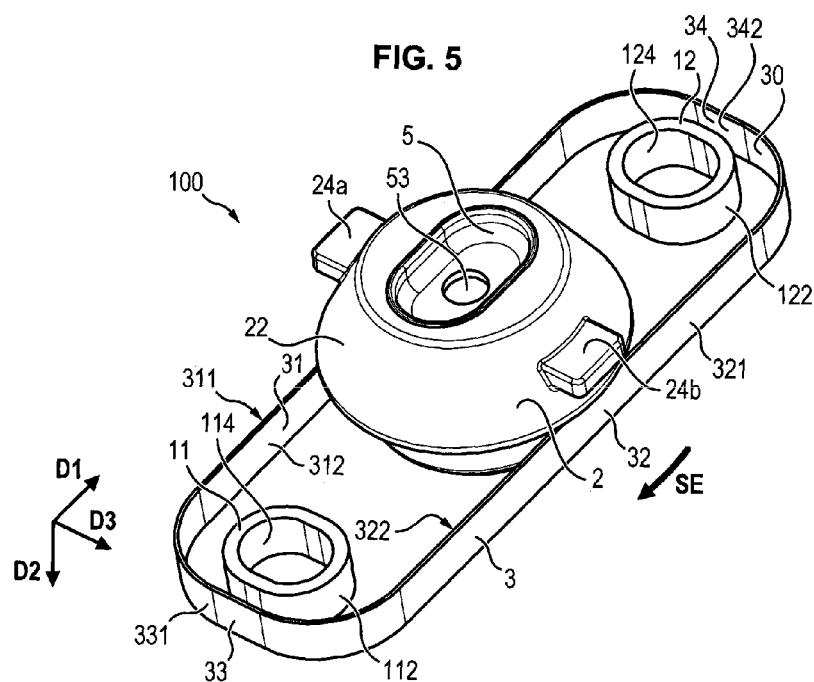
Figure 6:
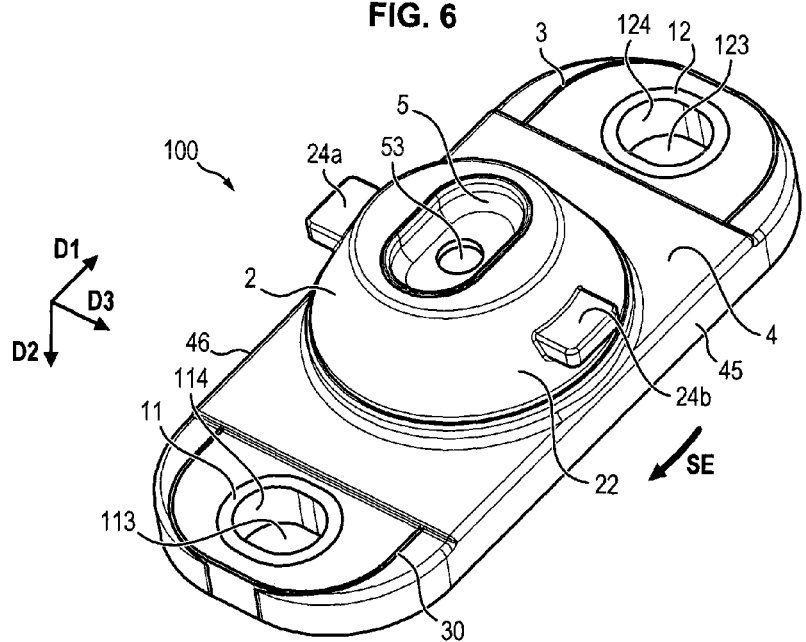
FIGS. 6 and 8 are schematic views in perspective from above and from below of the anti-vibration support according to the first embodiment of the invention.
Figure 7:
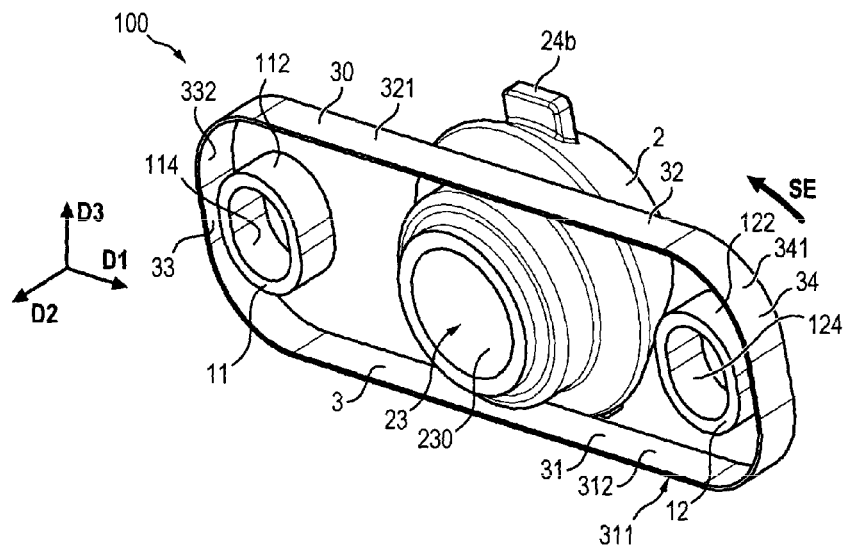
Figure 8:
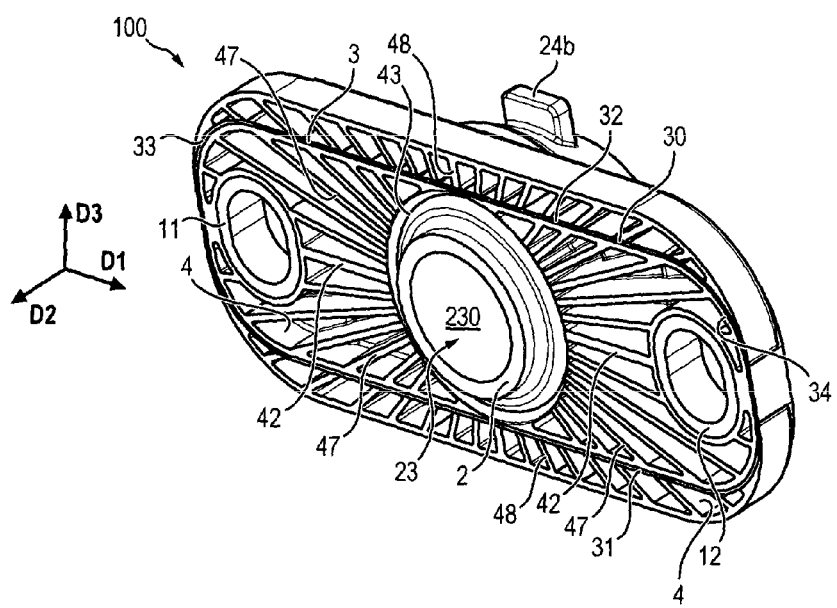
Figure 11:
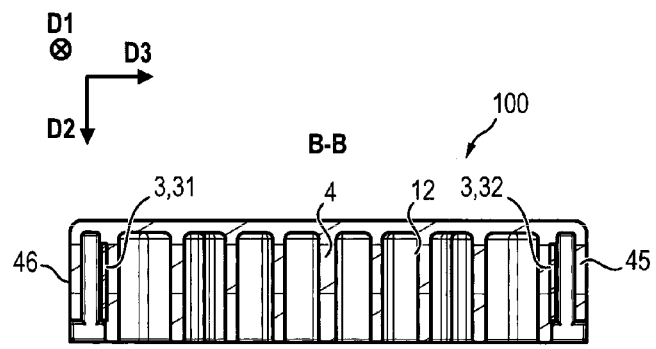
Figure 12:
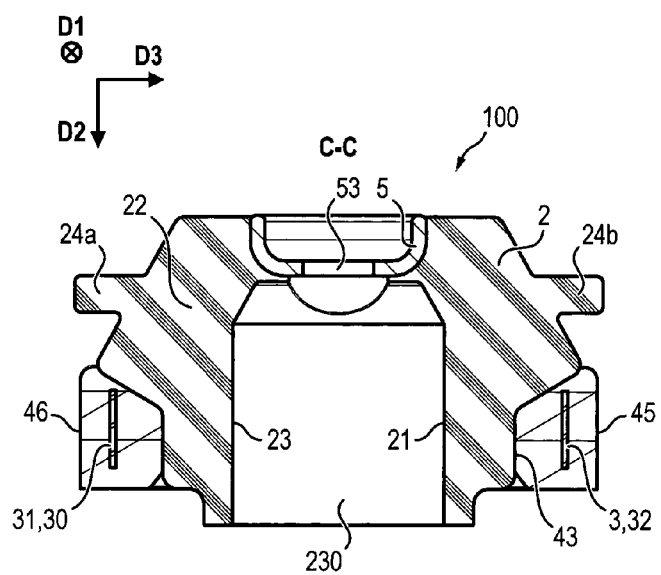
Figure 13:
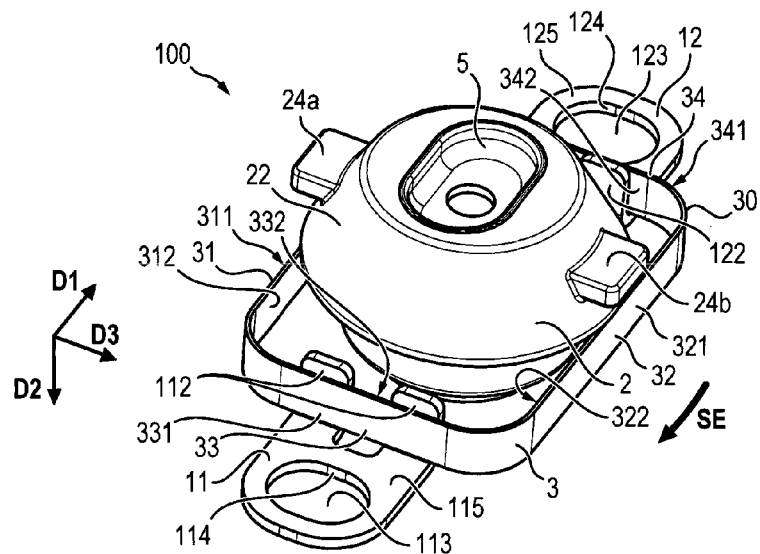
Figure 14:
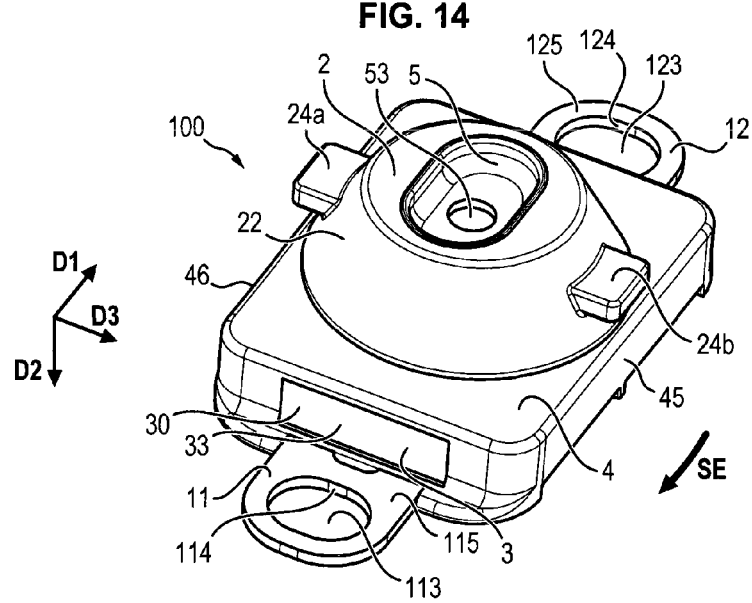
Figure 15:
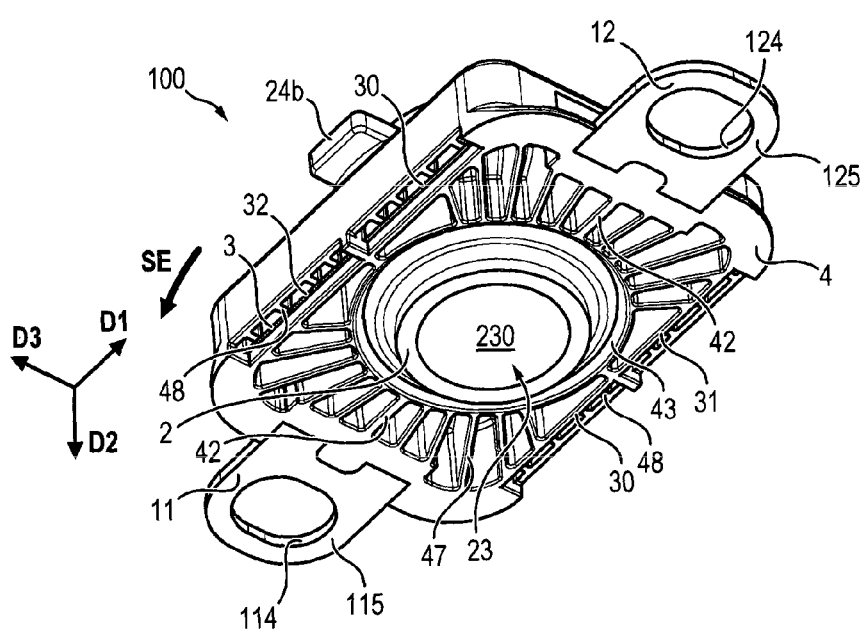
Figure 16:
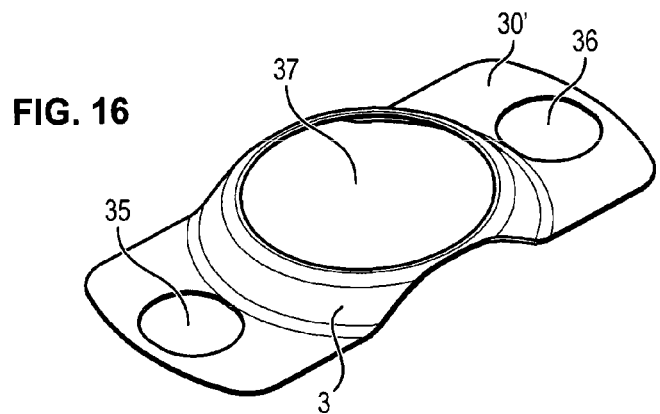
Figure 17:
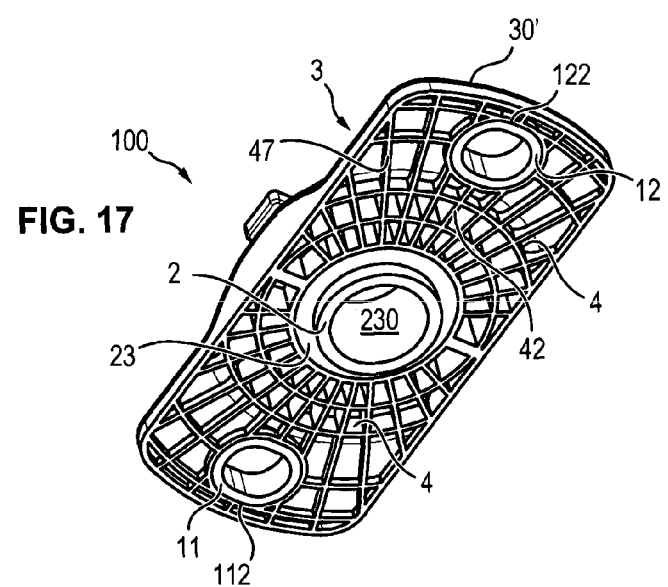
Figure 18:
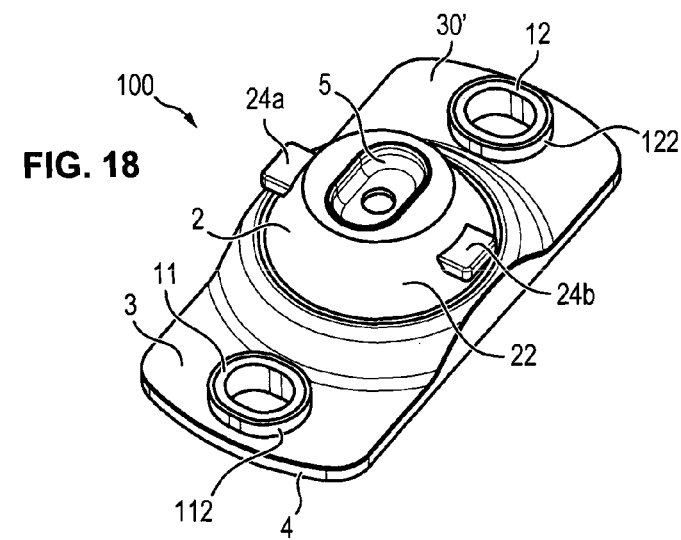

FIGS. 5 and 7 are views similar to FIGS. 6 and 8, where are shown only the portions of the anti-vibration support according to the first embodiment of the invention connected by the part made of thermoplastic, which was not shown, FIGS. 9 to 15 are schematic views similar to FIGS. 1 to 6 and 8, for an anti-vibration support according to a second embodiment of the invention, FIG. 16 is a schematic view in perspective of a reinforcement of a third embodiment of the anti-vibration support according to the invention, and FIGS. 17 and 18 are schematic views in perspective from above and below of this support.

Described below with reference to the figures are embodiments of an anti-vibration support 100 according to the invention. Of course, the anti-vibration support 100 can be different from the embodiments described below.

In FIGS. 1 to 15, the anti-vibration support 100 comprises a first metal frame 11, a second metal frame 12 and a third metal frame 5. The first frame 11 is separated from the second frame 12 in a first, substantially horizontal direction D1. The third frame 5 is separated from the frames 11 and 12 in at least a second substantially vertical direction D2, oriented from top to bottom.

The frames 11 and 12 must be fixed to a body of a motor vehicle when the anti-vibration support 100 is fixed to this body.

The first frame 11 and the second frame 12 are connected together by means of the member 4 made of thermoplastic material. The member 4 is oblong in the first direction D1, called the longitudinal direction D1.

The member 4 made of thermoplastic material comprises a continuous-fiber reinforcement 3. The reinforcement 3 can be a prefabricated part, which can for example be rigid. The continuous fibers can for example be embedded in a polymer to form the prefabricated part. The positioning of the reinforcement 3 and/or of the fibers is arranged to obtain maximum reinforcement of the anti-vibration support.

The reinforcement 3 can have unidirectional continuous fibers, or multidirectional continuous fibers, or woven or non-woven fibers. The reinforcement 3 can be a prefabricated part made of one or more tapes composed of continuous fibers and of the polymer, the positioning of the tape(s) being arranged to obtain maximum reinforcement of the anti-vibration support.

The reinforcement 3 can have any shape.

The reinforcement 3 can have an annular shape, or a loop shape, or an oblong shape, or a curved shape, or a three-dimensional shape, or a surface shape (with a small thickness), or others.

According to one embodiment, the reinforcement 3 can surround the first and second surfaces 112 and 122 at a distance from them, for example around the vertical direction D2.

Described below with reference to FIGS. 1 to 15 is an example of a reinforcement 3 in the form of a loop. Of course, the reinforcement 3 can have any other shape.

According to one embodiment, shown in FIGS. 1 to 15, the reinforcement 3 can for example be a closed loop 30 or a ring 30, which surrounds both the first surface 112 of the frame 11 and the second surface 122 of the frame 12, at a distance from them.

According to one embodiment, shown in FIGS. 16 and 17, the reinforcement 3 can for example have a surface shape, for example in the form of a two-dimensional or three-dimensional plate 30', i.e. having a dimension in the vertical direction D2 that is much smaller than horizontally, and which surrounds both the first surface 112 of the frame 11 and the second surface 122 of the frame 12, at a distance from them, the plate 30' being able to be curved and comprising fourth and fifth openings 35 and 36 which the first and second frames 11, 12 respectively pass through in the direction D2, and a sixth opening 37 which the part 2 made of elastomer passes through in the direction D2, the member 4 being able to be situated under the plate 30'.

The member 4 made of thermoplastic material is overmolded against at least one portion of at least one surface of the reinforcement 3, against the first and second surfaces 112 and 122 and against at least one surface of at least one part 2 made of elastomer.

The reinforcement 3 can be partially or entirely embedded in the member 4 made of thermoplastic material. In the embodiments shown in FIGS. 1 to 15, the reinforcement 3 comprises two first and second branches 31 and 32, rectilinear or curved, extending along the first direction D1 from the first frame 11 to the second frame 12 at a distance from them, the branches 31 and 32 connecting to one another by means of curved portions 33 and 34 bypassing the frames 11 and 12 and situated at a distance from them. Portions of the outer surface 311, 321 of the branches 31 and 32 and portions of the inner surface 312, 322 of the branches 31 and 32 are covered by the member 4. At least one portion of the inner surface 332, 342 of the curved portions 33 and 34 is covered by the member 4. At least one portion of the outer surface 331, 341 of the curved portions 33 and 34 is covered by the member 4. The inner and outer directions designate the interior of the loop 30 and the exterior of the loop 30. The member 4 comprises outer edges 45 and 46 extending in the longitudinal direction D1 running from the frame 11 to the frame 12, these edges 45 and 46 being situated at a distance and further outside with respect to the branches 31 and 32 of the reinforcement 3. The member 4 can comprise ribs 42 extending between the frames 11, 12 and its opening 43 and/or ribs 47 extending between the reinforcement 3 and its opening 43 and/or ribs 48 extending between the branches 31 and 32 of the reinforcement 3 and the edges 45, 46.

The reinforcement 3 allows reinforcing, particularly horizontally, the overall mechanical strength of the anti-vibration support, particularly between the first frame 11 and the second frame 12.

According to one embodiment, for example, the loop 30 of the reinforcement 3 extends in a substantially horizontal winding direction SE around the second, substantially vertical direction D2. The continuous fibers of the loop 30 of the reinforcement 3 extend in the substantially horizontal winding direction SE around the second, substantially vertical direction D2. The reinforcement 3 is for example a flat loop 30 with a rectangular transverse section having a larger height in the substantially vertical direction D2 than in its thickness, which is transverse to this direction D2.

According to one embodiment, for example, the reinforcement 3 can be prefabricated by arranging tape(s) of any shape, for example by winding a tape made of said unidirectional continuous fibers embedded in the polymer and extending in the winding direction SE to adhere several layers of tape in thickness or in width (the width of the reinforcement 3 being in the direction D2). The reinforcement is prefabricated separately from the other portions of the anti-vibration support 100. The fibers can for example be made of carbon or of glass fibers or others.

The part 2 made of elastomer is situated between the third metal frame 5 and the member 4 made of thermoplastic material. The third metal frame 5 is fixed to the part 2 made of elastomer, directly or indirectly to it. The third metal frame 5 serves as an interface with a vibrating portion of the motor vehicle. This vibrating portion can be an engine or others, in which case the anti-vibration support 100 is an engine support. For example, the third metal frame 5 is intended for the suspension of a propulsion engine of the motor vehicle, in particular of an internal combustion engine (gasoline or diesel for example).

The part 2 made of elastomer is a part for damping mechanical vibrations. The part 2 made of elastomer is used to support the frame 5 at a distance from the thermoplastic member 4 and/or at a distance from the frames 1 and 2 in the direction D2. Thus, the mechanical vibrations transmitted to the third metal frame 5 by the vibrating portion, when the vibrating portion is fixed to this third frame 5, are damped by the part 2 made of elastomer with respect to the frames 11 and 12 when they are in their position fixed to the body of the motor vehicle. The body of the motor vehicle can comprise first and second fixing parts (not shown) on which are respectively fixed the first and second frames 11 and 12, these first and second fixing parts of the body being distant from one another in at least the first direction D1 (which can be the longitudinal direction D1 of the vehicle, extending from the rear to the front) and defining between them a passage in the substantially vertical direction D2.

The reinforcement 3 counteracts the fact that the second frame 12 moves from the first frame 11 in the direction D1 separating them, which is a longitudinal direction of the vehicle oriented from the rear to the front, and ensures better strength of the anti-vibration support. In particular, in the case of an anti-vibration support, this anti-vibration support passes successfully the frontal crash tests of the vehicle.

The part 2 made of elastomer is for example made of rubber. The third frame 5 can be composed of a single metallic material or be a metal-thermoplastic bi-component. The part 2 made of elastomer can also contain a hydraulic portion.

According to one embodiment, the member 4 made of thermoplastic material can comprise for example a first opening 43 allowing passage in the second, substantially vertical direction D2. This first opening 43 is surrounded by the reinforcement 3 or by the loop 30 of the reinforcement 3. The part 2 made of elastomer has an inner portion 21, itself having a second opening 23 allowing passage in the second direction D2. The second opening 23 is situated under the third metal frame 5 in the second direction D2. A passage 230 opening downward in the vertical direction D2 below the frame 5 is delimited by the opening 23. This passage 230 is surrounded by the opening 43. At the top of the opening 23, the upper portion 22 of the part 2 made of elastomer surrounds the third frame 5 around the direction D2.

In the embodiments shown in FIGS. 1 to 15, the second opening 23 of the part 2 made of elastomer passes through the first opening 43 of the member 4 made of thermoplastic material in the direction D2 and is surrounded by the latter, the inner portion 21 also being situated in the opening 43. Of course, the second opening 23 could be at a distance from the first opening 43 in the direction D2, the first opening 43 and the second opening 23 being aligned in the second, substantially vertical direction D2.

Thus one or more spindles used for the fixing of the third metal frame 5 to the vibrating portion can be made to pass vertically (in the second direction D2) in the second opening 23, this fixing occurring by the lower part of the third frame 5, the vibrating portion being then suspended under the anti-vibrating support 100.

In the embodiments shown in FIGS. 1 to 15, the third metal frame 5 can comprise at least one third opening 53, allowing passage in the second direction D2. This third opening 53 is situated above the second opening 23 and above the passage 230 in the second direction D2. The second opening 53 is accessible from above and from below. Thus it is possible to mount on the top of the opening 53 a spindle fixing member inserted in the opening 53 from below, this fixing member being able to be for example a bolt or others. The third frame 5 is accessible from above.

In the embodiments shown in FIGS. 1 to 15, the reinforcement 3 or the loop 30 of the reinforcement 3 can extend around the second, substantially vertical direction D2 and can surround both the first opening 43 of the member 4 made of thermoplastic material and the second opening 23 of the part 2 made of elastomer.

Thus, the member 4 made of thermoplastic material is not weakened by the openings 23 and 43, but rather is reinforced by the reinforcement 3.

In the embodiments shown in FIGS. 1 to 15, the part 2 made of elastomer can have, for example, an upper portion 22 which covers a portion 410 of the upper surface 41 of the member 4 made of thermoplastic material. This upper portion 22 forms a single part with the inner portion 21. This upper portion 22 supports the frame 5.

In the embodiments shown in FIGS. 1 to 15, the part 2 made of elastomer can comprise for example a first abutment protrusion 24a and a second abutment protrusion 24b for abutting downward against other corresponding portions of the anti-vibration support 100. The protrusions 24a, 24b are far from one another transversely to the second direction D2.

Thus, in the case of mechanical vibrations sent by the vibrating portion to the third metal frame 5 in the vertical direction, the protrusions 24a and 24b abut downward to damp these vibrations.

The protrusions 24a and 24b are for example situated above a portion of the reinforcement 3 in the direction D2. Thus, better stiffness is ensured for the anti-vibration support 100.

In the embodiments shown in FIGS. 1 to 15, the third metal frame 5 can for example extend in the second substantially vertical direction D2 between a first lower level N1 and a second upper level N2. The member 4 made of thermoplastic material extends in the second substantially vertical direction D2 between a third lower level N3 and a fourth upper level N4. The first lower level N1 can for example be situated above the fourth upper level N4.

In the embodiments shown in FIGS. 1 to 15, the portion 410 of the upper surface 41 of the member 4, covered by the part 2 made of elastomer, can for example comprises, on at least two opposite sides transverse to the direction D2, a descending slope 412a, 412b extending from an outer portion 411 of the upper surface 41 toward the interior at the first opening 43. Thus, the member 4 made of thermoplastic material plays the role of a cradle due to its opposite inclined surfaces 412a and 412b, against which the part 2 made of elastomer bears to oppose vibrations tending to separate the third metal frame 5 with respect to the first or second frame 11, 12.

In the embodiments shown in FIGS. 1 to 15, the part 2 made of elastomer can for example extend downward from the second opening 23 by a lower portion 25.

In the embodiments shown in FIGS. 1 to 15, the upper portion 22 of the part 2 made of elastomer can for example comprise, on at least two opposite sides transverse to the direction D2, a first outer sloped surface 251a, 251b rising from the upper surface 410 and/or 412a, 412b of the member 4 to the third frame 5. The surfaces 251a and 251b delimit two thick portions, respectively 253 and 254 of the upper portion 22 of the part 2 made of elastomer, which allows better damping of vibrations.

In the embodiments shown in FIGS. 1 to 15, the frames 11 and 12 can for example comprise respectively first and second holes 113 and 123, which serve for vertical passage for fixing to the body of the motor vehicle. The hole 113 is delimited by a free surface 114 of the frame 11. The hole 123 is delimited by a free surface 124 of the frame 12. The third free surface 114 is connected to the first surface 112 located in contact with the member 4. The fourth free surface 124 is connected to the second surface 122 located in contact with the member 4. The free surfaces 114 and 124 are accessible from the outside to accommodate in them members for fixing to the body, which can for example be screws or bolts. The holes 113 and 123 are for example oblong in the third horizontal direction D3 perpendicular to the directions D1 and D2.

In the first embodiment shown in FIGS. 1 to 8, the first and second frames 11, 12 can for example be formed by respectively first and second rings 11, 12 the interior of which delimits the first and second holes 113, 123. The free surfaces 114, 124 are situated at the inner side of the first and second rings 11, 12, while the first and second surfaces 112, 122 situated against the member 4 are situated at the outside of the first and second rings 11, 12. The rings 11 and 12 are for example cylindrical around the direction D2.

In the second embodiment shown in FIGS. 9 to 15, the third free surface 114 of the frame 11 can for example be situated on a first outer fixing tab 115 reaching out toward the outside of the member 4 in the first substantially horizontal direction D1 to the left. The fourth free surface 124 of the frame 12 is situated on a second outer fixing tab 125 reaching out toward the outside of the member 4 in the first substantially horizontal direction D1 to the right. The first and second tabs 115, 125 are for example horizontal and bent downward with respect to the first and second vertical surfaces 112, 122.

The invention claimed is:

1. An anti-vibration support comprising:
   a first frame being metallic, a second frame being metallic and a third frame being metallic or a metal-thermoplastic bi-component, each frame being separate from the others, the first, second and third frames being accessible from outside of the anti-vibration support;
   at least one elastomeric part made of an elastomeric material, the at least one elastomeric part supporting the third frame;
   a thermoplastic member made of thermoplastic material and including at least one reinforcement part, the at least one reinforcement part being prefabricated and having continuous-fibers to reinforce the anti-vibration support,
   wherein the first frame and the second frame are spaced apart from one another in a first direction, the first direction being substantially horizontal when the first frame and the second frame are fixed to a body of a motor vehicle,
   wherein the first frame and the second frame are connected one to another by the thermoplastic member,
   wherein the thermoplastic member is molded over—at least a portion of at least one surface of the at least one reinforcement part,
   a first surface of the first frame, a second surface of the second frame and at least one surface of the at least one elastomeric part, and
   wherein the third frame is adapted to suspend a vibrating portion of the motor vehicle and is further adapted for damping and filtering mechanical vibrations between the body and the vibrating portion.

2. The anti-vibration support according to claim 1, wherein the at least one reinforcement part surrounds the first surface and the second surfaces at least in the first direction.

3. The anti-vibration support according to claim 1, wherein the thermoplastic member further comprises:
   a first through opening oriented in a second direction orthogonal to the first direction, the second direction being substantially vertical when the first frame and the second frame are fixed to the body of the motor vehicle, the first through opening being surrounded by the at least one reinforcement part,
   an inner portion of the at least one elastomeric part having a second through opening oriented in the second direction, and a passage delimited by the second through opening and surrounded by the first through opening, the passage opening along the second direction and remote from the third frame.

4. The anti-vibration support according to claim 3, wherein the third frame includes at least one third through opening oriented in the second direction, the at least one third through opening being situated above the second through opening in the second direction when the first frame and the second frame are fixed to the body of the motor vehicle.

5. The anti-vibration support according to claim 3, wherein the at least one reinforcement part is a substantially planar closed loop_around a central axis of the passage, the central axis extending along the second direction, and the continuous fibers of the at least one reinforcement part are unidirectional and embedded in a polymer, the continuous fibers extending along a longitudinal dimension of the at least one reinforcement part.

6. The anti-vibration support according to claim 3, wherein the second through opening of the at least one elastomeric part is located within the first opening of the thermoplastic member.

7. The anti-vibration support according to claim 3, wherein the at least one reinforcement part is a closed loop around a central axis of the passage, the central axis extending along the second direction, and the at least one reinforcement part surrounds the first through opening and the second through opening.

8. The anti-vibration support according to claim 1, wherein the at least one elastomeric part includes an upper portion covering a portion of an upper surface of the thermoplastic member, the upper portion supporting the third frame.

9. The anti-vibration support according to claim 1, wherein the first surface and the second surfaces are vertical when the first frame and the second frame are fixed to the body of the motor vehicle.

10. The anti-vibration support according to claim 1, wherein the at least one elastomeric part includes an upper portion, a first abutment protrusion extending from a first side of the upper portion and a second abutment protrusion extending from a second side of the upper portion opposite the first side, each of the first abutment protrusion and the second abutment protrusion oriented along a third direction perpendicular to both the first direction and the second direction and adapted to bend away from the third frame when the third frame is subject to mechanical vibrations.

11. The anti-vibration support according to claim 1, wherein the third frame extends along a second direction between a first lower level and a second upper level and the thermoplastic member extends along the second direction between a third lower level and a fourth upper level, the second direction being substantially vertical and the first lower level being situated above the fourth upper level when the first frame and the second frame are fixed to the body of the motor vehicle.

12. The anti-vibration support according to claim 1, wherein the first frame and the second frames respectively comprise a first hole and a second holes, each oriented in a second direction, the second direction being substantially vertical when the first frame and the second frame are fixed to the body of the motor vehicle, the first hole and the second hole each being adapted for passage of a portion of the body of the motor vehicle to fix the body to the anti-vibration support, the first hole and the second hole delimited respectively by a third free surface and a fourth free surfaces, the third free surface connected to the first surface and the fourth free surfaces connected to the second surface, each of the third free surface and the fourth free surface being accessible from outside of the anti-vibration support.

13. The anti-vibration support according to claim 12, wherein the first frame and the second frames are formed respectively by a first ring and a second rings delimiting the first hole and the second holes, the third free surface and the fourth free surfaces being situated on an inner side of the respective first ring and second rings, the first surface and the second surfaces being situated on an outer side of the respective first ring and the second ring.

14. The anti-vibration support according to claim 12, wherein the third surface and the fourth surfaces are situated respectively on a first outer fixing tab and a second outer fixing tab,
each of the first outer fixing tab and the second outer fixing tab extending along the first direction and protruding out-ward away from the thermoplastic member on opposite sides of the thermoplastic member.

15. The anti-vibration support according to claim 14, wherein the first outer fixing tab and the second outer fixing tabs are angled with respect to the first surface and the second surfaces, respectively.

16. A modified motor vehicle comprising:
the body of the motor vehicle;
an engine mounted on the body; and
at least one anti-vibration support according to claim 1, the first frame and the second frame being fixed to the body, the third frame being fixed to the engine situated adjacent to the anti-vibration support.

* * * * *